United States Patent [19]

Atwood

[11] Patent Number: 5,179,858
[45] Date of Patent: Jan. 19, 1993

[54] MASS AIR FLOW METER
[76] Inventor: Robert K. Atwood, 3450 John R. Rd., Rochester, Mich. 48307
[21] Appl. No.: 761,294
[22] Filed: Sep. 17, 1991

Related U.S. Application Data

[63] Continuation-in-part of Ser. No. 524,581, May 17, 1990, Pat. No. 5,048,327.
[51] Int. Cl.$^5$ .......................................... G01M 19/00
[52] U.S. Cl. .................... 73/118.2; 73/204.21
[58] Field of Search ............ 73/118.2, 204.11, 204.21, 73/204.22

[56] References Cited

U.S. PATENT DOCUMENTS 4,776,213 10/1988 Blechinger .................. 73/204.11 X

FOREIGN PATENT DOCUMENTS 2102961 2/1983 United Kingdom ............... 73/118.2

Primary Examiner—Jerry W. Myracle
Attorney, Agent, or Firm—William L. Fisher

[57] ABSTRACT

A mass air flow meter having smaller overall external dimensions than prior devices to facilitate packaging within the engine compartment of a vehicle. Contributing to this smaller size is the use of an "inside-out" venturi in which the inside diameter of the device body is relatively straight and an airfoil shaped body located in the airflow causes the venturi effect. Advantages of this design include high signal to noise ratio, lower manufacturing costs and reduction of bulk.

6 Claims, 6 Drawing Sheets

MASS AIR FLOW METER

My present invention is a continuation-in-part of my prior invention entitled "Mass Air Flow Meter", Ser. No. 524,581 filed May 17, 1990, now U.S. Pat. No. 5,048,327 issued on the Sep. 17, 1991 (herein referred to as my "Pro-M-Dot" mass air flow meter).

By way of a trade name or trade mark for my present invention, I prefer to describe it as the "ISOV" mass air flow meter.

The principal object of my present invention is to provide a different embodiment of mass air flow meter than my "Pro-M-Dot" mass air flow meter, but which has most of the advantages of my "Pro-M-Dot" mass air flow meter together with additional advantages including lower manufacturing costs and reduction of bulk (to facilitate packaging of my "ISOV" mass air flow meter within the engine compartment of the vehicle).

The foregoing object of my invention, and the advantages thereof, will become apparent during the course of the following description, taken in conjunction with the accompanying drawings in which.

Figure 1:
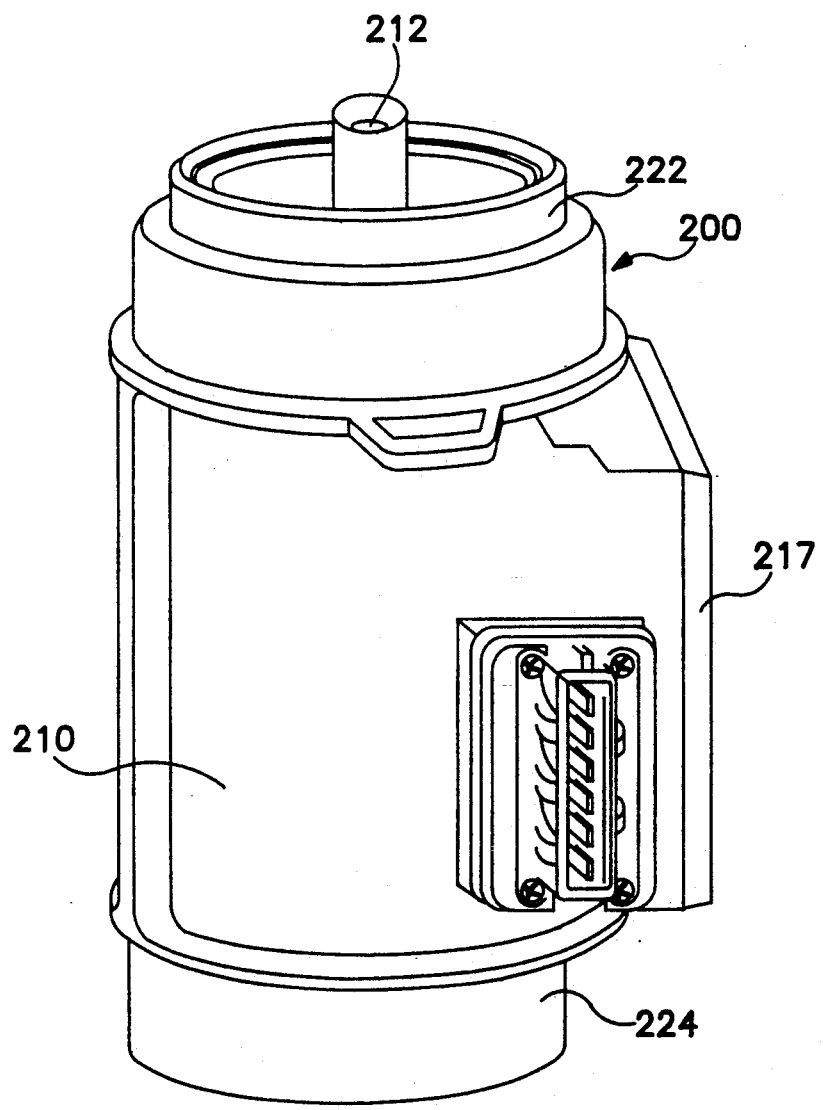
FIG. 1 is a perspective view of my "ISOV" mass air flow meter viewed so that a part of the sensing mechanism therefor is shown.
Figure 2:
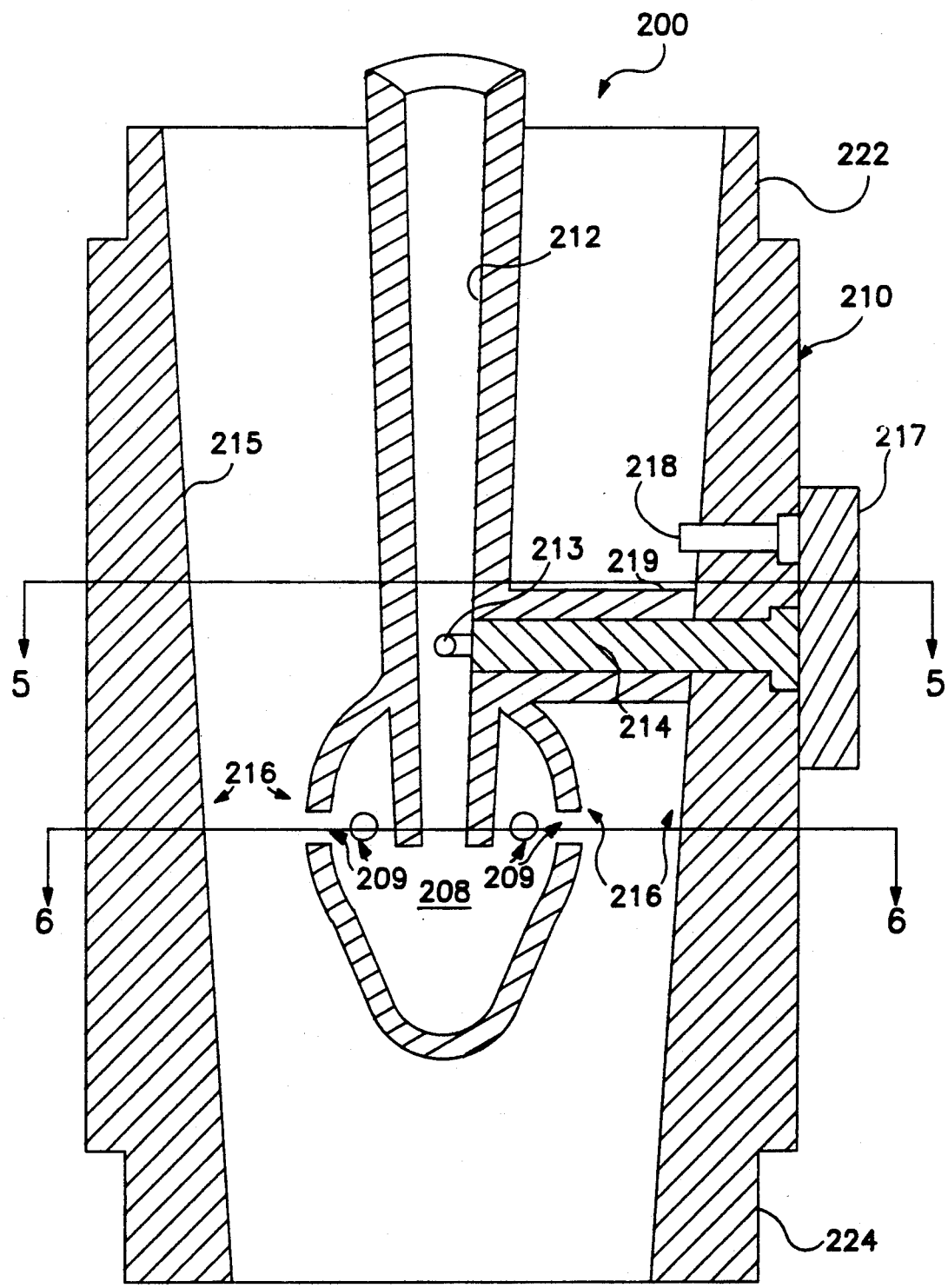
FIG. 2 is a central vertical sectional view thereof.
Figure 3:
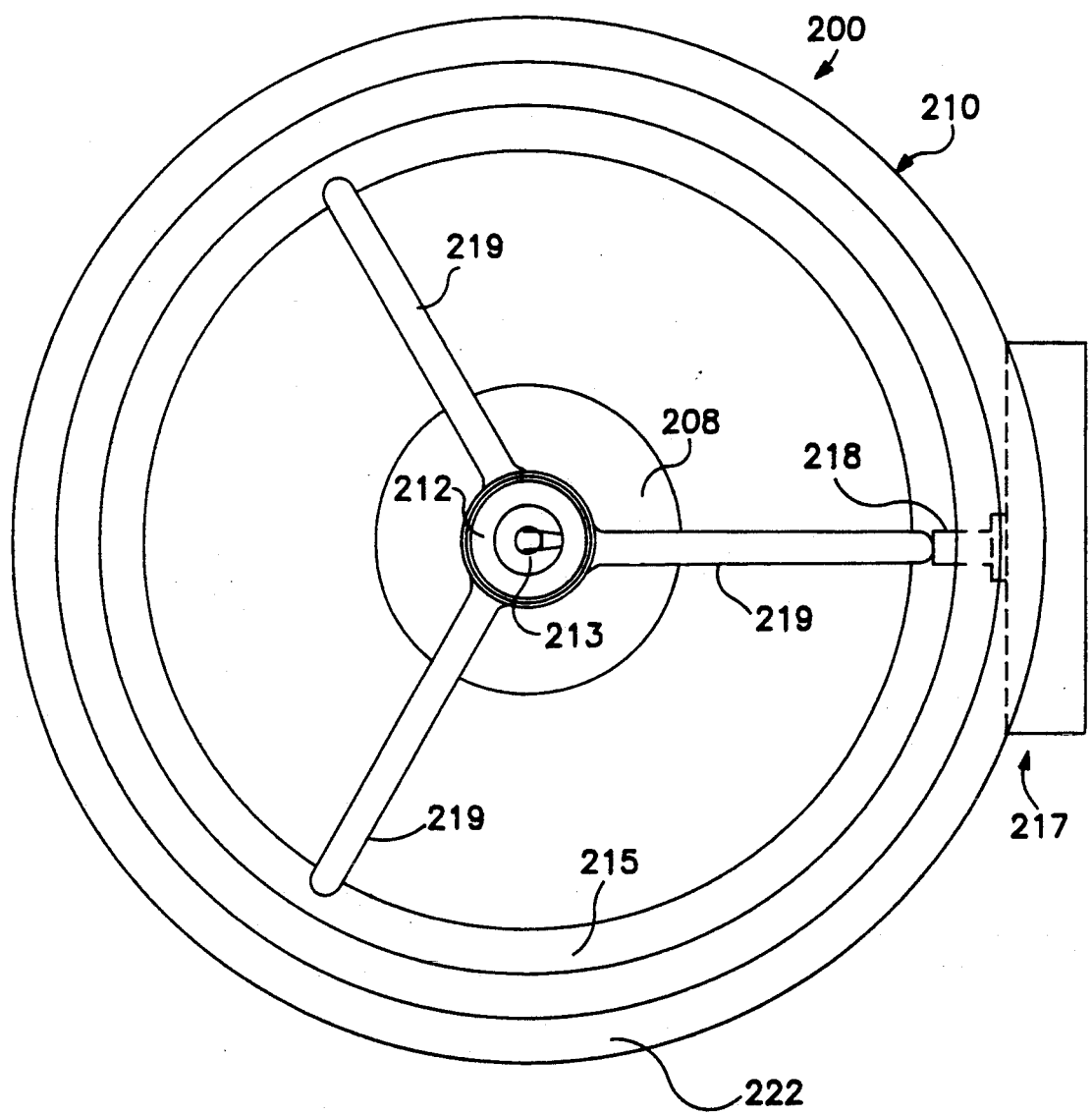
FIG. 3 is a top plan view of the thereof.
Figure 4:
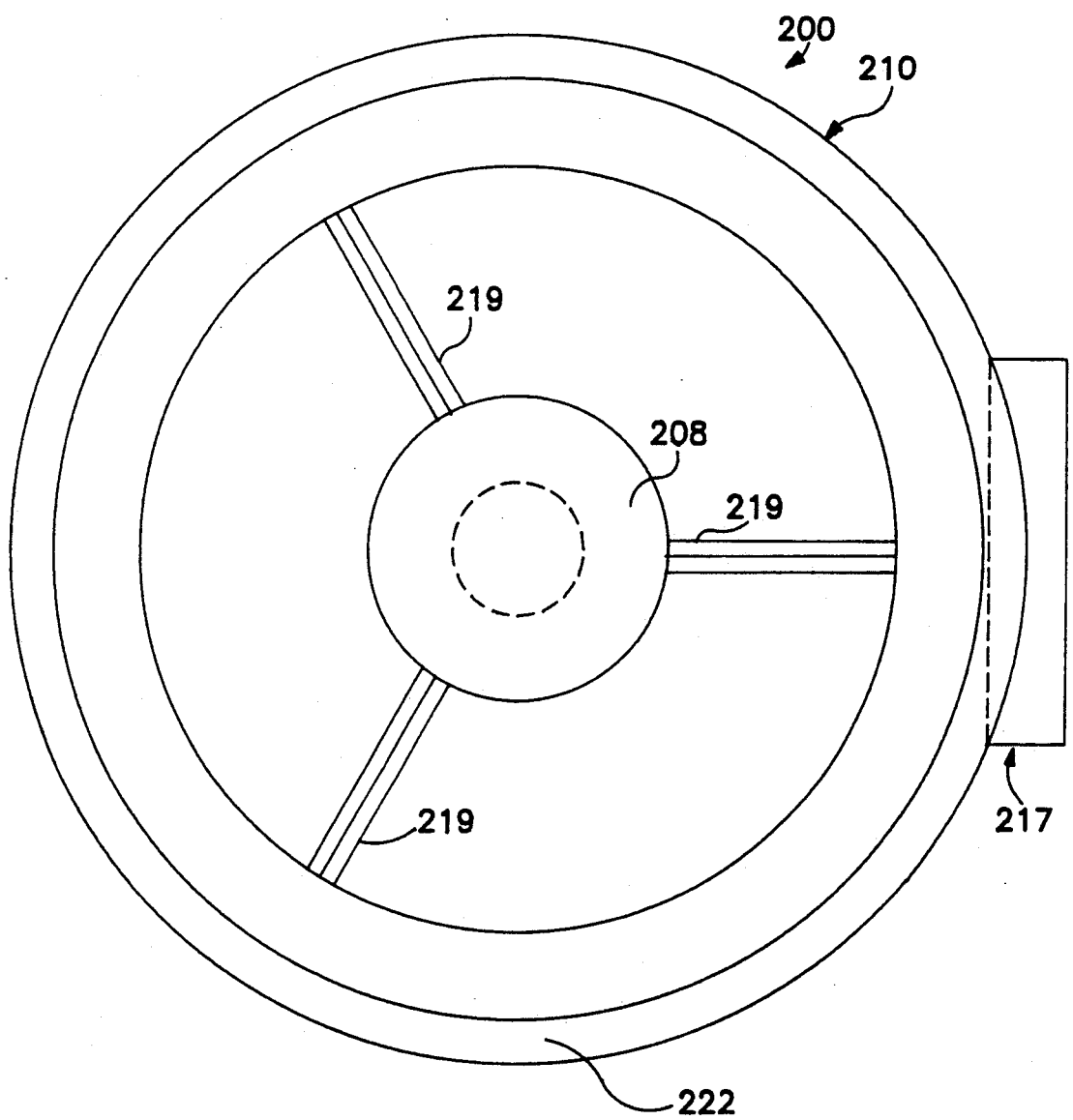
FIG. 4 is a plan view thereof.
Figure 5:
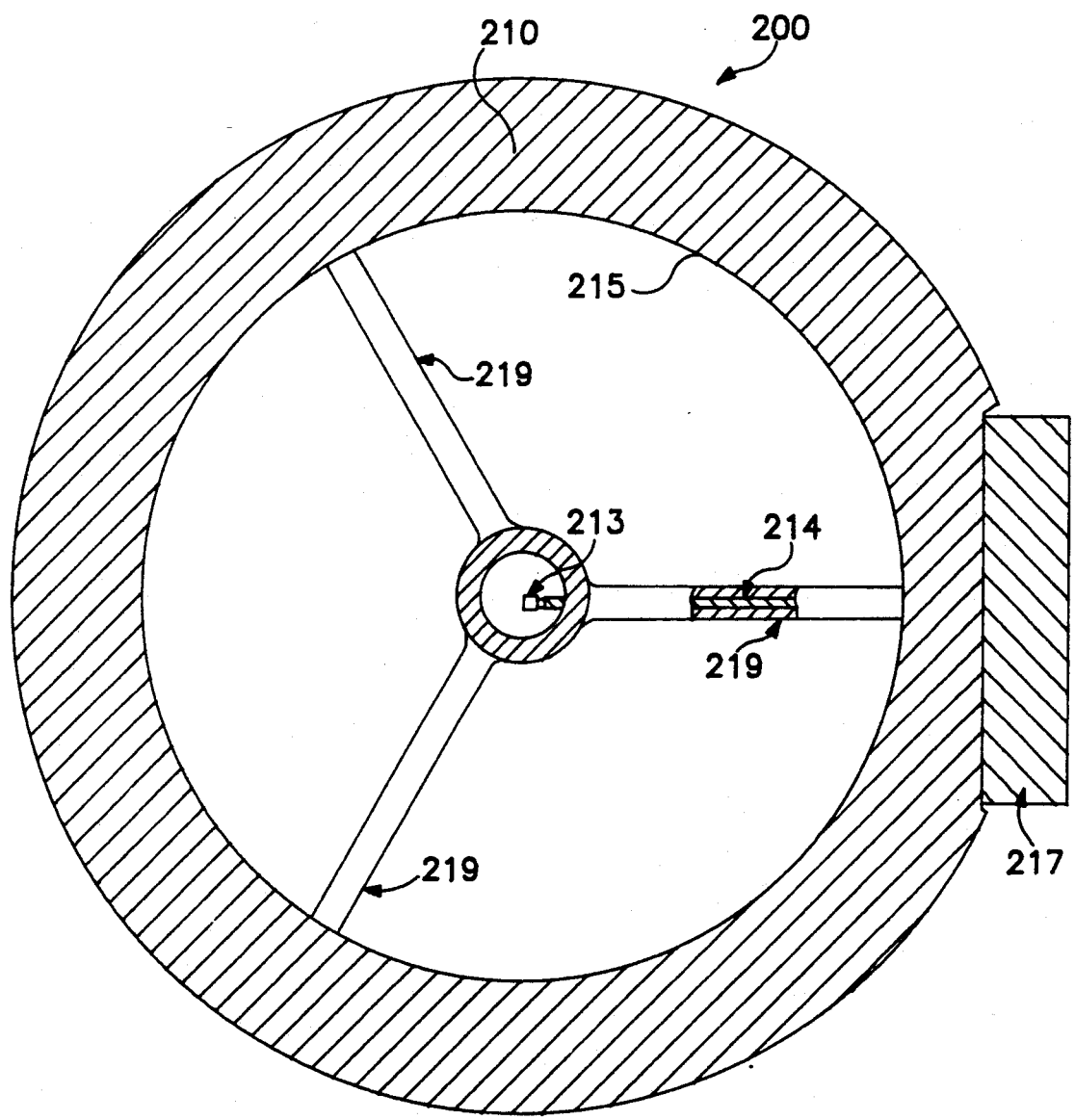
Figure 6:
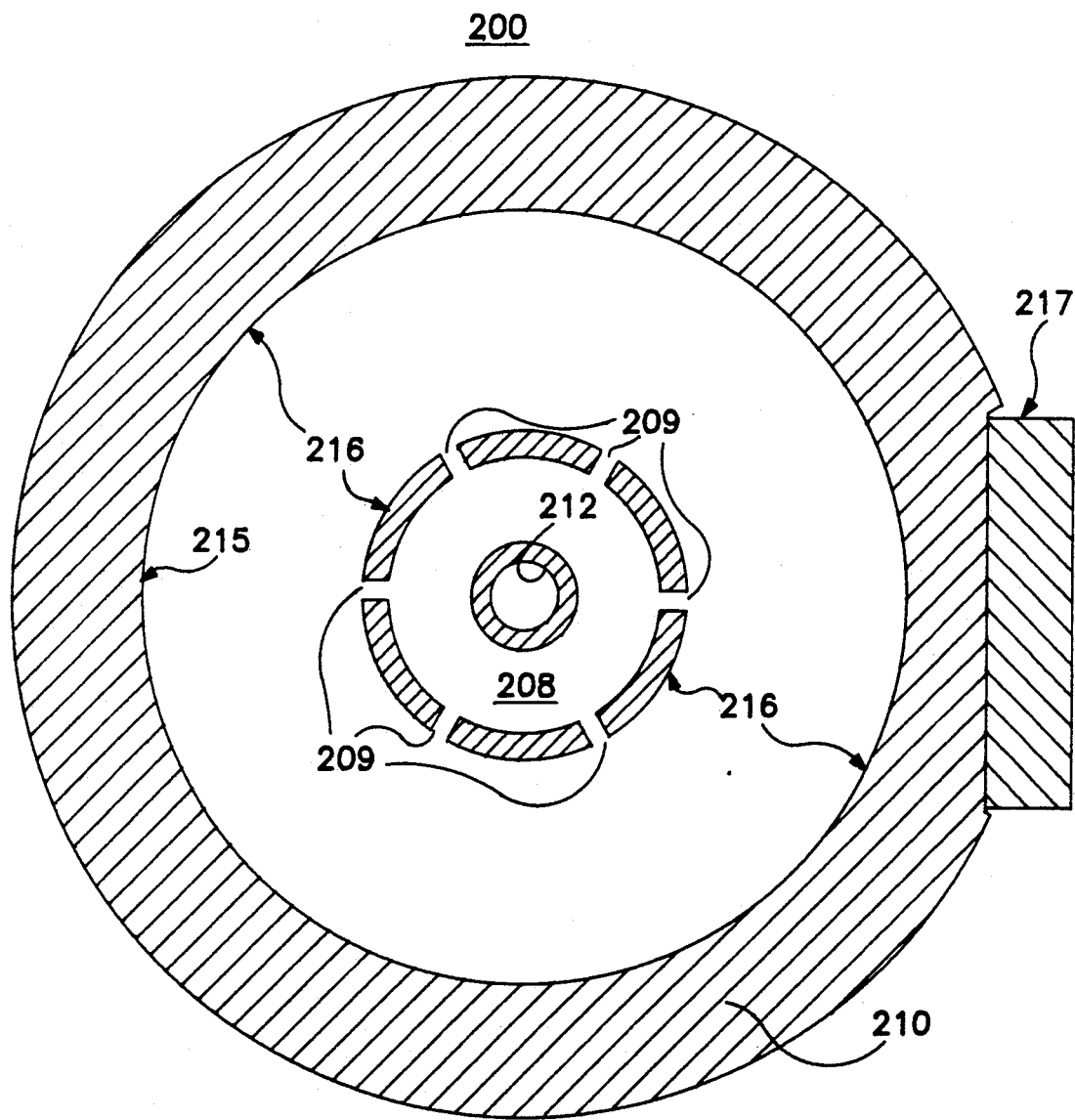

FIGS. 5 and 6 are respective horizontal sectional views thereof taken, respectively, through the lines 5—5 and 6—6 in FIG. 2.

Referring to the drawings in greater detail, my "ISOV" mass air flow meter shown therein is generally designated 200. Same has smaller overall external dimension than my prior Pro-M-Dot mass air flow meter to facilitate packaging of my "ISOV" mass air flow meter within the engine compartment of a vehicle. (In my Pro-M-Dot mass air flow meter), the venturi for the main airflow is provided by the main body thereof being formed to neck down to a minimum cross sectional area at the level where the flow restriction means 9 are located. Also the sample tube 12 is disposed laterally of the path of flow for the main air flow through the meter body #10. The meter body #10 has means for directly connecting to an air filter and, preferably, has a bell shaped entrance). In contrast thereto in my "ISOV" mass air flow meter 200 the venturi is "inside-out" in that the I.D. of the body 210 is relatively straight (actually a slight taper is provided which decreases in cross-sectional area in the direction of air flow therethrough) while a collecting chamber 208 having an upstream exterior surface providing an airfoil surface having a maximum exterior dimension is used to provide an annular cross sectional area 216. The "inside-out" venturi is located at the level where equally circumferentially spaced apart flow restriction apertures 209 are formed through the wall thickness of the collecting chamber 208. The "ISOV" mass air flow meter 200 does not directly connect with the engine air filter as is the case within my prior Pro-M-Dot mass air flow meter. However the "ISOV" mass air flow meter retains most of the benefits of my "Pro-M-Dot" mass air flow meter including a high signal to noise ratio and signal averaging via an R.C. time constant the latter will always have a lower pressure drop than my "ISOV" meter because of the superior job it does in capturing entrance air( due to its being directly joined to an air filter) and on account of its bell shaped entrance and also because of the unimpeded path it provides for the main air flow through the main body 210.

The internal cross section of the body 210 is generally cylindrical, but has a slight internal taper 215 therein. The taper 215 is such that the internal cross-sectional area of the body 210 decreases in the direction of the air flow so as to aid in profiling or columnating the main air flow through the body 210. The latter has a flange structure 222 at the entrance end thereof for connecting to a conduit (not shown) which, in turn, is connected to a remote air cleaner assembly (not shown). Another flange structure 224 is provided at the exit end of the body 210 for connecting to the entrance end of an engine throttling device at the entrance end of the intake vehicle for the vehicle. The tapered sample tube or duct 212 and the collecting chamber 208 are disposed coaxially centrally in respect to the longitudinal axis of the body 210. i.e. each is arranged in a substantially straight line, as shown. The sample tube 212 and the collecting chamber 208 are supported, in the instance shown, by a multi-leg spider structure 219 (having 3 legs, in this instance) which, in turn, is supported by and upon the inside wall of the body 210. One leg of the spider structure is hollowed out, as shown in FIG. 5, to receive and hold therein both an air flow sensing element 213 and an electrically insulated holder 214 for the latter. A prior art signal amplifying and conditioning device 217 is affixed to the outside wall of the body 210 and is electrically connected to the flow transducer 213, as is well known in the art. Each leg of the spider structure 219 is longer in axial length than in circumferential width as can be seen by comparing FIGS. 2 and 5. The legs of the spider structure 219 (though not shown herein) are each shaped as an inverted teardrop (symmetrical in vertical cross-section) to provide an airfoil surface in respect to the main air flow through the body 210 so as to minimize air resistance.

Where the upstream end of the collecting chamber 208 joins the downstream end of the sample duct 212, there is provided a steep air foil shape, (on the exterior surface of said collecting chamber 208), which as previously mentioned, expands rapidly in diameter to a maximum at the level where flow restriction apertures 209 are located to create, with the interior of the body 210, an inside-out venturi (annular area cross-sectional area) as shown in FIG. 2. Downstream from the flow restriction apertures 209, the collecting chamber 208 gradually decreases in diameter (by about 25 degrees included angle) to provide an "inside-out" recovery cone 220 (annular area cross-section) to reduce the pressure drop across the mass air flow meter 200. The ratio of the volume of the collecting chamber 208 to that of the sample tube 212 and to the area of the flow restriction means 209 is substantially the same as in my "Pro-M-Dot" mass air flow meter. The maximum vacuum is created at the flow restriction means (in the form of equally circumferentially spaced apertures 209 formed through the wall of the collecting chamber 208) to produce maximum draw of the air flowing through the sample duct 212. The tapered wall of the sample duct 212 is extended downwardly (internally of the collecting chamber 208) below the level of the flow restriction means 209 to isolate the flow of air exiting from the sample duct 212 from that which has accumulated in the collection chamber 208 and which exits therefrom outwardly through the flow restriction means 209.

In this embodiment 200, the ambient temperature reference wire 218 for the flow transducer 213 is disposed on the tapered wall 215 above the hollow spider leg because of the space limitation of the latter. This is different from the Pro-M-Dot mass air flow meter in which the ambient temperature reference wire is incorporated into the electronics of the sensing element 213.

The shape of the collecting chamber 208 below the flow restriction means 209 is tapered in decreasing cross-sectional dimension (in the direction of the air flow) to provide an "inside out" recovery cone to reduce pressure drop across the mass air flow meter 200. It is preferred that the exit end of the body 210 extend below the end of the collecting chamber 208 by at least 1 diameter (of the collecting chamber 208; maximum diameter at the level of the flow restriction apertures 209) to recover pressure drop. It is preferred that the entering end of the sample duct 212 extend above the entering end of the body 210 to isolate the former from turbulence at the mechanical interface for the entering end of the body 210.

Nearly all of the advantages of the "Pro-M-Dot" mass air flow meter as discussed in my prior patent application Ser. No. 524,581 are realized in my "ISOV" mass air flow meter including that of signal to noise enhancement of the tapered sample tube 212 and the low pass filter provided by the collecting chamber 208 and the flow restriction means 209. The descriptions and explanations of the "Pro-M-Dot" mass air flow meter contained in my prior patent application Ser. No. 524,581 are also applicable to my "ISOV" mass air flow meter. Likewise, the illustrations (in FIGS. 12 and 13) of the signal to noise enhancement provided by the tapered sample tube and the illustrations of the low pass filter (in FIGS. 10 and 11A through 11D) are also applicable to my "ISOV" mass air flow meter.

What I claim is:

1. In a mass air flow meter for internal combustion engines having a hollow elongated body having a minimum cross-sectional area therein forming a venturi, a sample duct associated with said elongated body for receiving a flow of sample air therethrough, said sample duct being tapered in decreasing area in the direction of the air flow therethrough, the entire air source for the engine being split into a main flow path through said elongated body and into a sampling path through the sample duct, an air flow transducer disposed in said sample duct near the minimum cross-sectional area thereof, the flow through the sample duct downstream from said transducer being accumulated in a collecting chamber and the flow exiting from the latter passing through flow restriction means and then being recombined with the main flow of air through said elongated body, the improvement comprising:

(a) the collecting chamber being formed at the lower end of the sample duct so as to receive direct in-line flow therefrom;
   (b) both the sample duct and the collecting chamber being supported within the interior of said elongated body centrally coaxially thereof;
   (c) the exterior surface of said collecting chamber being an airfoil surface having a maximum external dimension so as to form, with the inside cross-sectional area of said elongated body, an inside-out venturi having a minimum annular cross-sectional throat area;
   (d) the principal internal volume of said collecting chamber (for accumulation of sample air exiting from said sample tube) being disposed downstream from the location of the minimum throat area; and
   (e) flow restriction means through the wall thickness of the collecting chamber body at the location of said minimum throat area, said flow restriction means serving as the outlet for the air accumulated in said collecting chamber.

2. Improvement in a mass air flow meter for internal combustion engines as claimed in claim 1 in which the exterior surface of the collecting chamber (downstream from the location of the inside-out venturi) is tapered in decreasing cross-sectional dimension (in the direction of air flow through said elongated body) to enhance recovery of pressure drop across said mass air flow meter.

3. Improvement in a mass air flow meter for internal combustion engines as claimed in claim 2 in which the exit end of the flow meter body extends downstream of the collecting chamber to further enhance the recovery of pressure drop across said air flow meter.

4. Improvement in a mass air flow meter for internal combustion engines as claimed in claim 1 in which said elongated body has a straight taper (in decreasing cross-sectional area in the direction of air flow therethrough).

5. Improvement in a mass air flow meter for internal combustion engines as claimed in claim 1 in which the downstream end of the sample tube is extended downstream of the upstream end of the collecting chamber and internally thereof to a level below that of the flow restriction means so as to isolate the flow of air exiting from the sample tube from that which exits through the flow restriction means.

6. Improvement in a mass air flow meter for internal combustion engines as claimed in claim 1 in which the entering end of the sample duct is disposed upstream from the entering end of said elongated body to isolate the air entering the sample tube from the turbulence at the entrance end of said elongated body.

* * * * *